TELEPHONE LINE CIRCUIT

Filed June 4, 1963 2 Sheets-Sheet 1

INVENTOR
R. K. YORK
BY
R. C. Winter
ATTORNEY

United States Patent Office 3,284,576
Patented Nov. 8, 1966

3,284,576

TELEPHONE LINE CIRCUIT

Robert K. York, Piscataway Township, Middlesex County, N.J., assignor to Bell Telephone Laboratories, Incorporated, New York, N.Y., a corporation of New York Filed June 4, 1963, Ser. No. 285,372
12 Claims. (Cl. 179—84)

Figure 1:
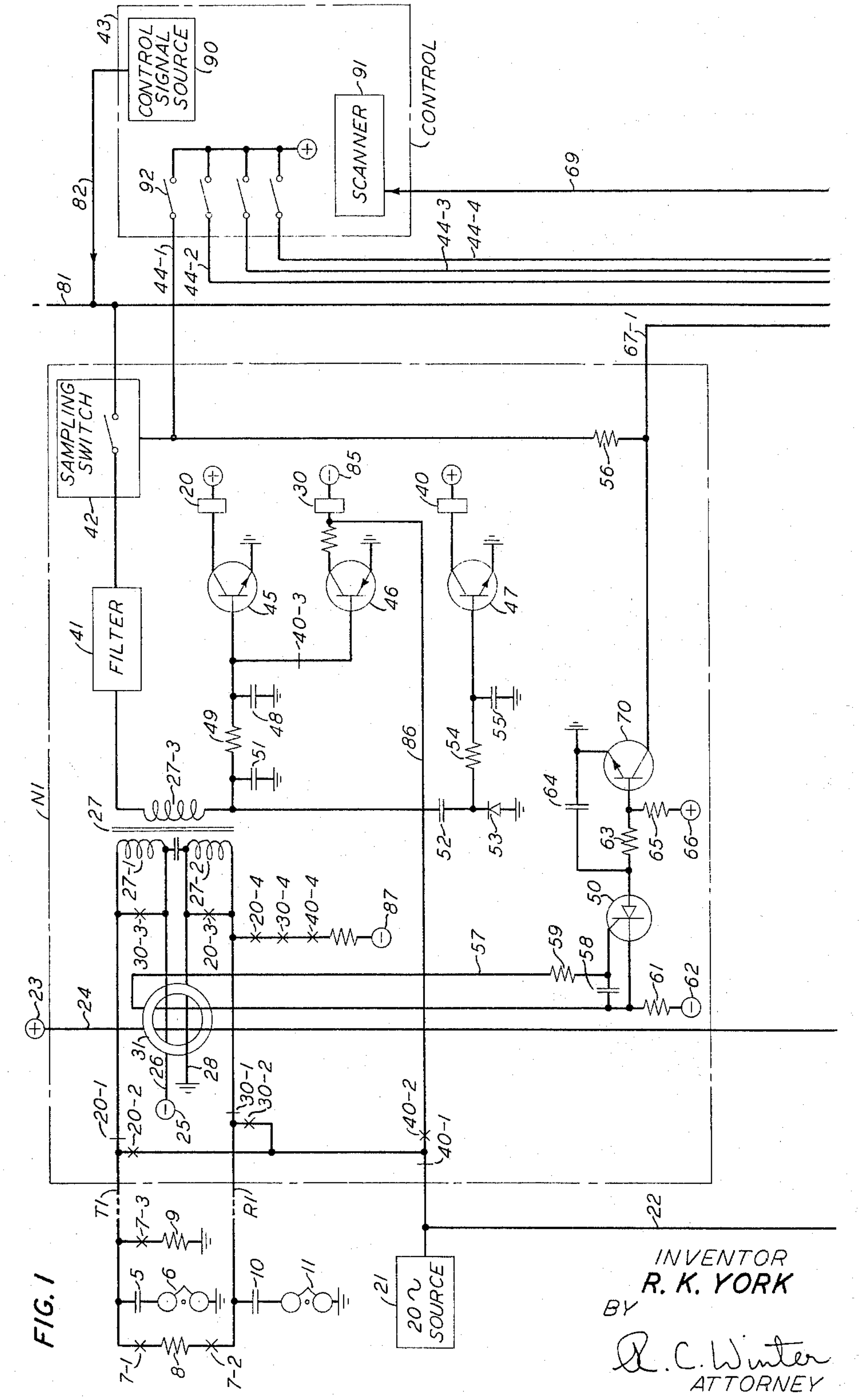

This invention relates to telephone line circuits and more particularly to multi-party line circuits for time division switching systems.

A time division switching system is one in which a plurality of lines and trunks are connected to a common bus. Each line or trunk is connected to the bus through a filter and gate network, and is served in a particular time slot in each cycle of operation; that is, the gate associated with the line or trunk is closed to connect the line or trunk to the bus for only a fraction of each cycle of system operation. Two interconnected lines, or an interconnected line and trunk, have their gates operated in the same time slot, and a physical connection is thus completed once in each cycle of operation. The gates thus serve as sampling switches, the gates sampling the continuous waveforms on the two interconnected channels. The essence of time division switching is that sufficient samples completely identify a continuous waveform. The filter connected to each sampling switch smooths the samples, and in effect serves as a buffer between the continuous waveform on the line or trunk and the sampled data of the switch.

A multi-party line is one serving two or more subscribers. The most common of these lines are the two- and four-party lines. The telephone system must be capable of ringing each of the parties individually. In addition, it is often necessary for the system to be able to identify the two parties on a two-party line when a service request is originated. Numerous prior art circuits provide selective ringing for multi-party lines as well as two-party identification. These circuits, however, are not generally applicable to time division switching systems.

It is a general object of this invention to provide a multi-party line circuit having selective ringing and party identification for a time division switching telephone system.

Two of the many supervisory functions that must be performed in a telephone system are the detection of a calling party's service request, and the detection of a called party's answer. Conventional telephone circuits provide two separate relays for these supervisory functions, a line relay to detect a service request, and a ringing trip relay to detect the answer.

It is another object of this invention to provide a reduced number of supervisory elements in a line circuit for performing the necessary supervisory functions.

It is still another object of this invention to provide means for operating in common with a plurality of multi-party line circuits to effect a further reduction in the per unit cost and complexity of the line circuits.

In accordance with the illustrative embodiment of the invention each multi-party line is connected through a transformer, filter, and sampling switch to the common bus. A control unit governs the operation of each switch. In the particular time slot serving the line, the line is connected to the bus. Such an arrangement is disclosed, for example, in F. S. Vigliante, R. D. Williams and E. L. Seley Patent No. 3,268,669, issued Aug. 23, 1966.

A magnetic core is coupled to the tip and ring conductors of each line. A pulsing circuit, common to four multi-party line circuits, pulses the four respective cores to set the various core fluxes in a first state. When a subscriber originates a call the line current sets the respective core flux in the second state. Consequently, each time the pulsing circuit applies a pulse to the core the flux is switched to the first state, the flux being switched immediately back to the second state by the line current at the termination of the pulse. The switching of the flux back and forth induces a signal in a read-out conductor threading the respective core in each line circuit. The signal on this read-out conductor, together with a scanning pulse from the control, notifies the control that one of the two parties on a particular line is requesting service. In this manner, the provision of a single magnetic core for each line and common pulsing circuitry enables the control to be notified of a service request. The request is initiated by line current flowing through the core.

For a terminating call the control governs the application of a ringing signal to either the tip conductor of a line to ring a tip party, or the ring conductor of the line to ring a ring party. The ringing current is of large magnitude and cannot be transmitted through the switch and filter in each line circuit. Consequently, the control unit causes a small magnitude control signal to be applied to the common bus at the same time that the control unit closes the gate of the line which is to be rung, the control signal not only indicating that ringing is to be applied but also which party is to be rung. The ringing control signal is transmitted only to the line circuit serving the line to be rung. The control signal controls circuitry in the line circuit which causes the ringing current to be applied to either the tip or ring conductor.

If the ringing current is applied to the tip conductor it flows through the tip conductor to ground at the tip party's station. When the tip party answers by going off-hook the tip and ring conductors are connected to each other through the off-hook subset impedance, and the ringing current is now extended to the ring conductor. The ring conductor is threaded through the supervisory core, and during either the first or second half cycle of the ringing current after the tip party answers, the core is biased to the second state. The pulsing circuit applies pulses to the core at a rate much greater than the frequency of the ringing current. Consequently, during the first or second half cycle of the ringing current after the tip party answers the call, the core flux is switched back and forth. The control unit is notified of the flux switching in the same manner as it is when a service request is originated. Thus notified that the called party has answered, the control unit removes the ringing control signal from the common bus and the ringing current is no longer applied to the tip conductor.

Similarly, if the ring party is called the ringing control signal applied by the control unit to the common bus governs the application of a ringing current to the ring conductor. When the ring party goes off-hook the current is extended to the tip conductor. The tip conductor is also coupled to the supervisory core and the core flux is switched to the second state during either the first or second half cycle of the ringing current after the ring party answers. The control unit is once again notified of the answer and no longer applies the ringing control signal to the common bus.

The single supervisory core in each line circuit is also utilized for the party identification. When one of the two parties on a two-party line originates a service request, the control unit governs the line connection to the common bus. The control unit applies control signals to the bus which cause the coupling of the tip and ring conductors to the core to be broken. Instead a path is completed from the tip conductor to a detecting circuit. Connected to the tip conductor at the tip party location is a resistor connected to ground. If the tip party originated the call, current flows through the tip conductor and this resistor to ground, the current being detected by the detecting circuit. The detecting circuit in turn sets the core flux in the second state. As a consequence, the pulsing circuit switches the core flux, and the detecting and pulsing circuits cause the core flux to be switched back and forth continuously. This flux switching is detected in the same manner as it is in the call origination and answer sequences, and the control unit is notified that the tip party originated the call. If, on the other hand, the ring party originated the call, the tip party resistor is not connected to the tip conductor. The detecting circuit is not operated and the core flux is not switched. The absence of the flux switching back and forth is interpreted as a ring party call origination.

It is a feature of this invention to provide a single supervisory magnetic core in a line circuit for detecting a service request and an answer and for identifying the calling party in a multi-party line.

It is another feature of this invention to provide means for biasing the supervisory magnetic core by a direct current to detect a service request or a tip party call orgination and to bias the core with ringing current to detect an answer by the called party.

It is another feature of this invention to provide equipment common to a plurality of multi-party line circuits for operating with the respective supervisory magnetic core in each line circuit.

It is another feature of this invention to provide means for supplying a pulse series to indicate the off-hook condition of a telephone line, the pulse train being supplied even during the dialing interval.

It is another feature of this invention to provide means for controlling the application of ringing current in a multi-party line directly to the tip or ring conductor in response to control signals transmitted to the line circuit through a time division switching network and for similarly controlling the identification sequence at the line circuit in response to the transmission of control signals to the line circuit through the time division switching network.

Figure 2:
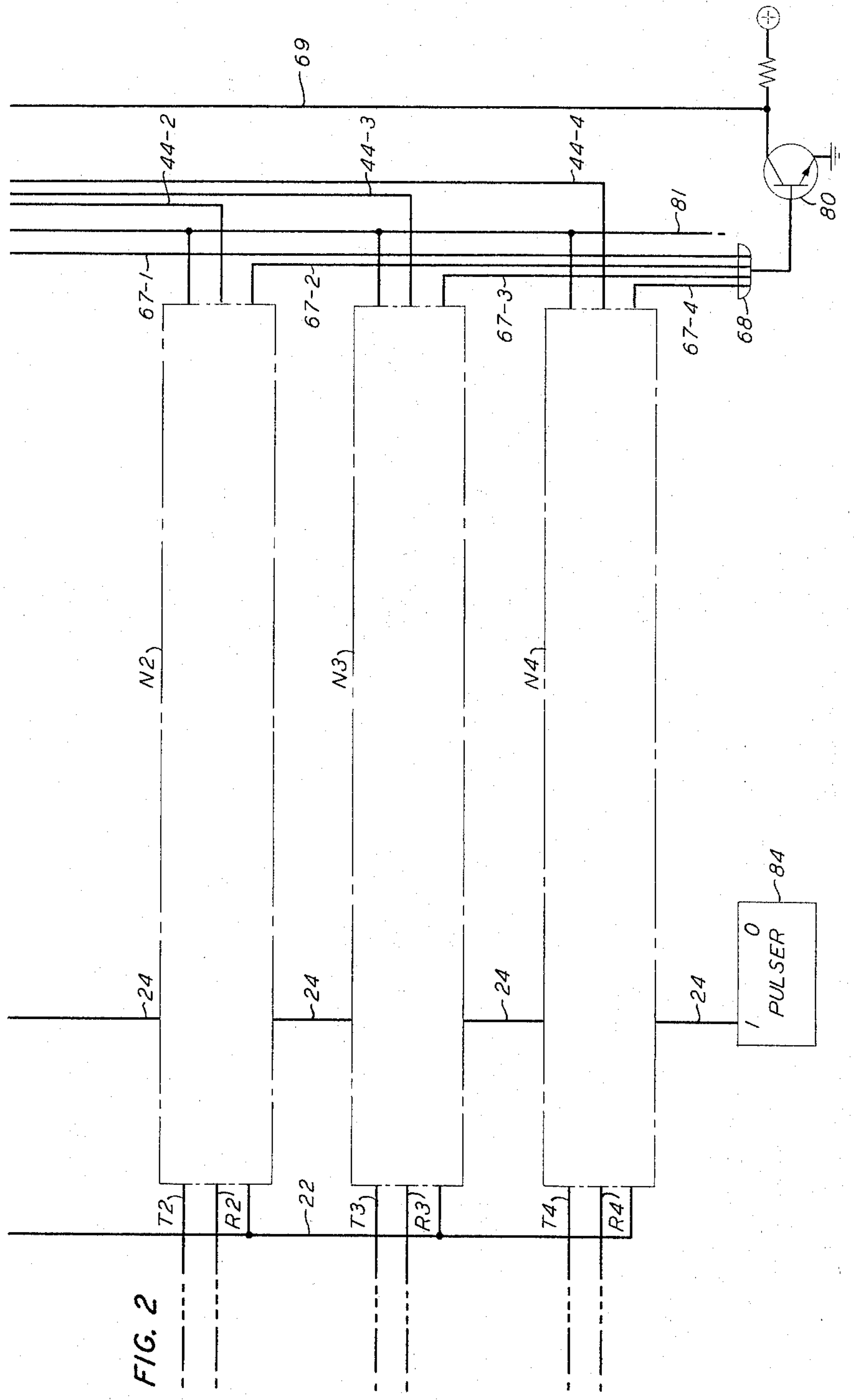

Further objects, features and advantages of the invention will become apparent upon consideration of the following detailed description in conjunction with the drawing in which FIGS. 1 and 2 together disclose an illustrative embodiment of the invention.

In FIG. 1 the elements within network N1 comprise a two-party line circuit. Tip and ring conductors T1 and R1 serve the two parties connected to them. The tip party ringer 6 is connected through capacitor 5 to the tip conductor T1, and the ring party ringer 11 is connected through capacitor 10 to the ring conductor R1. Contacts 7–1 and 7–2 are closed when either party goes off-hook, while contacts 7–3 are closed only when the tip party is off-hook. Resistor 8 represents the off-hook subset impedance. Line circuits N2, N3 and N4, in FIG. 2, are similar to line circuit N1, and for this reason are shown only symbolically.

Common bus 81 is connected to each of the four line circuits shown in the drawing, as well as to other line circuits in the telephone system. The bus may also be connected to trunk circuits if the latter are included in the system. Control 43 is connected to each of the line circuits by one of conductors 44–1 through 44–4. The control unit is not shown in detail; the present invention relates to line circuits, and is applicable to time division switching systems in general, the invention not being limited to use in any one particular system. When a pulse appears on conductor 44–1, the pulse originating from the operation of symbolic switch 92, sampling switch 42 closes, and conductors T1 and R1 are connected through line circuit N1 to the common bus. If at the same time a control pulse appears on one of the other conductors such at 44–2 through 44–4, or the control conductors connected to other line or trunk circuits in the system, a talking path is established between tip and ring conductors T1 and R1 and another line or trunk. This physical path is completed only once in every office cycle, and the sampling period, the period of the physical connection, is determined by the length of the office cycle divided by the number of lines served. Two parties may talk to each other when their respective sampling switches are operated in the same sampling period or time slot in each cycle. Although only samples are thus transmitted to and from common bus 81, the filters, such as filter 41 in line circuit N1, smooth the samples so that continuous signals appear in the lines themselves.

Once in each cycle of operation, control 43 applies the switch control pulse to conductor 44–1. This pulse, in addition to closing sampling switch 42, is transmitted through resistor 56 and appears on conductor 67–1, as described below, if the tip or ring party is off-hook. The pulse then passes through OR gate 68 and transistor 80 to conductor 69. The pulse is detected by scanner 91, and the control 43 is thus notified that the tip or ring party is off-hook. The pulse originating on conductor 44–1 is thus sent back to the control on conductor 69 once in every office cycle during the entire period that the tip or ring party is off-hook.

If the line is idle, control 43 applies the pulse to conductor 44–1 once in every 500 office cycles. Although this pulse closes sampling switch 42, there is no effect on the system as the line is idle and common bus 81 is connected to no other line circuit in the same time slot. As will be shown below, however, after one of the parties goes off-hook, the next pulse on conductor 44–1 appears on conductor 69 to notify the control 43 of the service request. A time slot is assigned to the line and pulses now appear on conductor 44–1 once every office cycle rather than once every 500 cycles. The increased rate is required once a service request is originated because sampling switch 42 must be operated at a greater rate for the samples to sufficiently define the speech waveforms. When the line is not in use, however, a slower rate is preferred as more time slots are then available to serve lines in use.

For a terminating call, control 43 notes the identity of the called party and thereafter applies the control pulses to conductor 44–1 once per office cycle. In either event, i.e., for both originating and terminating calls, the control pulses on conductor 44–1 appear on conductor 69 every office cycle for the duration of the call. The control is notified of the call termination when the pulses on conductor 44–1 are no longer transmitted through the line circuit to conductor 69.

Magnetic core 31 is utilized both to detect a service request and an answer, as well as in the two-party identification sequence. Conductor 24 is coupled through this core, as well as through the cores in line circuits N2–N4, to pulser 84. Once every office cycle, output 1 of the pulser is grounded and current flows from source 23 through each of the cores such as 31. This current is in a direction tending to set the flux in each core in the counterclockwise direction. If the tip and ring parties are both on-hook however the core flux is maintained continuously in this direction, and as a result no induced pulse appears on conductor 57.

When either party goes off-hook direct current flows from negative source 25, through conductor 26, primary winding 277–1, contacts 20–1, the tip conductor, the off-hook subset impedance, the ring conductor, contacts 30–1, primary winding 27–2, and conductor 28 to ground. This current sets the core flux in the clockwise direction. The next pulse on conductor 24 resets the flux in the counterclockwise direction. Immediately after the termination of this pulse the line current sets the flux once again in the clockwise direction. This switching of the core flux continues as long as either party remains off-hook, As a result a pulse is induced in conductor 57 once every office cycle during the entire period that either party is off-hook.

PNPN triode 50 is normally nonconducting, and turns on only when a positive pulse is induced in conductor 57 and is transmitted through resistor 59 to the control terminal. At this time current flows from ground through capacitor 64, PNPN triode 50, and resistor 61 to source 62. When the capacitor charges sufficiently the triode turns off. The charging period required to turn off the triode is less than one office cycle. The triode turns on once again however when the next pulse from pulser 84 is applied to conductor 24.

Transistor 70 is normally conducting, the base being connected through resistor 65 to positive source 66. However, when the PNPN triode 50 is conducting the base is connected through the triode and resistor 61 to negative source 62, and the magnitude of this source is sufficient to turn transistor 70 off. Thus while triode 50 is on, transistor 70 is off. Transistor 70 must be held off during the entire period that either party is off-hook. Triode 50 however is held on for less than an office cycle. Other means are provided to insure that transistor 70 remains off during the balance of each office cycle. When the triode first conducts, capacitor 64 charges from source 62, and when the triode turns off the capacitor discharges through resistor 63 and 65 into source 66. This discharge period is considerably greater than an office cycle. Thus transistor 70 is held off for a sufficient period after the triode turns off. This insures that transistor 70 is held off continuously while either party is off-hook.

The long discharge period of capacitor 64 is provided for the following reason. It is the nonconduction of transistor 70 which will be shown below to control the transmission of the control pulses on conductor 44–1 to conductor 69. The pulses must appear on conductor 69 during the entire off-hook period. This period includes the dialing interval. When the originating party dials, in effect, he is on-hook during the break of each dial pulse. The break of each dial pulse exceeds an office cycle in duration, and thus were the discharge period of capacitor 64 of short duration, and were the next pulse on conductor 24 to be applied during the break of a dial pulse, transistor 70 would turn on. Triode 50 would not break down twice in succession during the break of a dial pulse as no line current is flowing to set core 31. Although the PNPN triode does not continuously break down during the break of each dial pulse, capacitor 64 nevertheless maintains transistor 70 off. As the break of each dial pulse is less than the discharge period of capacitor 64, transistor 70 is held off even during the dialing interval. In this manner control pulses appear on conductor 69 even during the dialing period of an originating call.

Transistor 70 determines whether or not the pulses on conductor 44–1 are transmitted to conductor 69. If the transistor is on, the pulses on conductor 44–1 are shorted to ground through the transistor, and no pulses appear on conductor 67–1. Only if the transistor is off are the pulses on conductor 44–1 transmitted to conductor 67–1.

Transistor 80 is normally nonconducting. A pulse on any one of conductors 67–1 through 67–4 is transmitted through OR gate 68 to the base of transistor 80. When transistor 80 turns on a negative pulse appears on conductor 69.

It should be noted that OR gate 68, transistor 80, and pulser 84 are common to all of the line circuits N1–N4. The pulse on conductor 24 is applied to all of the line circuits simultaneously, but the transistor 70 in each line circuit is held off only if one of the respective tip or ring parties is off-hook. Control 43 applies the control pulses to conductors 44–1 through 44–4 in different time slots. Thus, for example, if a control pulse is applied to conductor 44–3 and control 43 detects a pulse on conductor 69, the control is notified that the tip or ring party connected to line circuit N3 is off-hook. Because control 43 applies the pulses to conductors 44–1 through 44–4 in different time slots the same pulsing and detecting circuitry may be used in common with all of the line circuits.

The circuitry described above is the means by which control 43 detects a service request and supervises the duration of each call. The remaining circuitry is provided to apply selective ringing on each line, to detect an answer by the called party, and to identify a calling party.

In conventional telephone systems ringing current is applied through the switching network and the line circuit to the line. It is not practical however to apply ringing current through a time division switching network. The ringing voltage is of very large magnitude, and for the ringing signal to be transmitted through the time division switching network sampling switch 42 and filter 41 must be capable of passing these large magnitude signals. The design of these elements is considerably more complex if the ringing current itself is transmitted through the time division switching network. For this reason control 43 only transmits small magnitude control signals through the time division switching network to the various line circuits. The line circuits are provided with means for directly applying ringing signals to the lines in response to the control signals.

Control signal source 90 in control unit 43 applies a small magnitude positive potential to common bus 81 over conductor 82 when a tip party is to be rung, and a small magnitude negative potential when a ring party is to be rung. If either party served by line circuit N1 is to be rung, the control signal on conductor 82 is applied during the same time slot in which the pulse from the control appears on conductor 44–1. Of all sampling switches in the system only sampling switch 42 operates in this time slot, and thus the control signal is transmitted only to line circuit N1. The small magnitude positive or negative control potential is applied once in each cycle, and the samples are smoothed by filter 41 to provide a continuous D.C. voltage. The filter comprising capacitors 51 and 48, and resistor 49 further smooths the control signal and insures that a continuous D.C. level is applied to the bases of transistors 45 and 46. The D.C. signal is not applied to the base of transistor 47 as capacitor 52 blocks it.

If control signal source 90 applies positive ringing control signals to the common bus, transistor 45 turns on and relay 20 operates. Contacts 20–1 open, and contacts 20–2 close. Ringing current from source 21 is thus applied through contacts 40–1 and 20–2 to tip conductor T1. As contacts 20–1 are open current flows over the tip conductor only to the subscriber location rather than to primary winding 27–1 as well. The ringing current flows through capacitor 5 and ringer 6 to ring the tip party.

When the tip party answers and contacts 7–1 and 7–2 close, the ringing current is extended from the tip conductor to the ring conductor. The ring party is not rung however as the voltage across ringer 11 is considerably less in magnitude than the voltage of source 21 due to the off-hook subset impedance 8. The ringing current is extended via ring conductor R1, normal break contacts 30–1, operated make contacts 20–3, and conductor 28 to ground. The flux in core 31 is initially in the counterclockwise direction as a result of the prior pulses on conductor 24. The current in conductor 28 switches direction in alternate half cycles. When current flows from left to right in this conductor the flux is switched to the clockwise direction. This left to right current flows in conductor 28 either immediately when the tip party goes off-hook and the ringing current is extended to the ring conductor, or within the next ringing current cycle after he goes off-hook. The latter situation arises if the tip party answers during a positive half cycle of the ringing. In such a situation the ringing current in conductor 28 is in a direction to maintain a counterclockwise flux. However, when the next negative half cycle of ringing is applied by source 21, the core flux switches direction. Thus the core flux switches to the clockwise direction either immediately when the tip party answers or within the next ringing current cycle of a second thereafter.

When the core flux first switches a negative pulse is induced in conductor 57. This pulse however does not break down PNPN triode 50 as this triode breaks down only when a positive pulse is applied to its control terminal. Within the next office cycle after the core flux is switched to the clockwise direction, pulser 84 applies a pulse to conductor 24 which resets the core flux to the counterclockwise direction. At this time a positive pulse is induced in conductor 57 and PNPN triode 50 breaks down. The control 43 continuously applies control pulses to conductor 44–1 every office cycle, as the line comprising conductors T1 and R1 is now in use. As soon as PNPN triode 50 conducts and transistor 70 turns off, the control pulses on conductor 44–1 are transmitted to conductor 69. The control is thus made aware that the called party has answered. The positive ringing control signals applied over conductor 82 are no longer supplied by control 43, transistor 45 turns off, and relay 20 releases. As contacts 20–2 open, ringing is no longer applied to the tip conductor. At this time ringing current no longer flows through conductor 28. However, as contacts 20–1 are now closed the line current flowing from source 25 through conductor 26, primary winding 27–1, the tip and ring conductors, primary winding 27–2, and conductor 28 to ground maintains the core flux in the clockwise direction. Each pulse on conductor 24 resets the flux in the counterclockwise direction, the flux being immediately set in the clockwise direction by the line current when the pulse on conductor 24 terminates. PNPN triode 50 thus breaks down every office cycle, transistor 70 is maintained off, and the pulses on conductor 44–1 continue to appear on conductor 69 every office cycle. The call is supervised as described above until its termination when the tip party hangs up.

If the ring party is to be rung rather than the tip party, control signal source 90 applies negative ringing control signals to common bus 81 over conductor 82. A continuous negative potential is now applied to the bases of transistors 45 and 46, and transistor 46 turns on rather than transistor 45. Relay 30 operates rather than relay 20. As contacts 30–2 are now closed rather than contacts 20–2 the ringing current from source 21 is applied to the ring conductor R1. This current flows through ringer 11 to notify the ring party of the call. When the ring party answers the current is extended to the tip conductor. The tip party is not rung as the voltage across ringer 6 is insufficient to operate the ringer, this voltage being smaller in magnitude than the source voltage due to off-hook subset impedance 8. The ring current is extended however through contacts 20–1 and 30–3, and conductor 26 to source 25. Once again the core flux is switched to the clockwise direction either immediately when the ring party answers or within the next ringing current cycle thereafter. Within an office cycle after the core flux switches to the clockwise direction it is switched back to the counterlockwise direction by a pulse on conductor 24. At this time the positive pulse induced in conductor 57 breaks down PNPN triode 50. The control is notified of the ring party's answer in the same manner as it is notified of the tip party's answer. The negative ringing control signals are no longer applied over conductor 82 and relay 30 releases. When contacts 30–2 open ringing is no longer applied to the ring conductor. As contacts 30–1 are now closed the line current flows through the core rather than the ring current. The duration of the call is supervised in the same manner as it is when the tip party is called.

For an originating call control 43 must determine which of the two parties on the line is to be billed. As described above either party going off-hook to originate a call results in the continuous switching of the core flux. The first pulse on conductor 69 notifies control 43 of the service request. The control now initiates the two-party identification sequence. This sequence, as the ringing sequence, is governed by control signals transmitted over conductor 82 to common bus 81. Control 43 applies a small magnitude alternating signal superimposed on a positive level to conductor 82 in each time slot serving the call. These signals are applied in the same time slot during which the control pulse appears on conductor 44–1. The samples provided by sampling switch 42 are smoothed by filter 41. Capacitor 48 shorts the alternating signal to ground, and thus only the positive level is applied to the base of transistor 45. Relay 20 thus operates. The positive voltage level is blocked by capacitor 52 but the alternating waveform is transmitted through this capacitor to the junction of diode 53 and resistor 54. The diode shorts the negative half cycles of the alternating control signal to ground, and thus a positive unidirectional pulsating voltage is applied to the resistor. This pulsating waveform is smoothed, or stretched, by capacitor 55 and a continuous positive voltage is applied to the base of transistor 47. Relay 40 thus operates together with relay 20. Contacts 40–3 open to insure that transistor 46 remains off.

Contacts 40–1 open to insure that ringing source 21 is not connected to the line. No current flows through the core at this time. Ringing current does not flow through the core as contacts 40–1 are open. Line current does not flow through the core as contacts 20–1 are open. Thus the core flux is maintained in the counterclockwise direction. As contacts 20–2 and 40–2 are now closed the winding of relay 30 is connected to the tip conductor over conductor 86. If the tip party originated the call contacts 7–3 are closed and current flows from source 85 through the winding of relay 30, conductor 86, contacts 20–2 and 40–2, the tip conductor, contacts 7–3, and resistor 9 to ground. Relay 30 operates and contacts 30–4 close. As contacts 20–3, 20–4, and 40–4 are also closed current flows from source 87 through these contacts and conductor 28 to ground. This current sets the core flux in the clockwise direction. As a result the next pulse on conductor 24 resets the core flux and the positive pulse induced in conductor 57 breaks down PNPN triode 50. The pulses on conductor 44–1 now appear on conductor 69 to notify the control that the service request originated with the tip party.

If the ring party originated the call, contacts 7–3 are open. Relay 30 does not operate and current from source 87 does not set the core flux in the clockwise direction. As the flux is continuously maintained in the counterclockwise direction the pulses on conductor 44–1 do not appear on conductor 69. Control 43 is thus made aware by the absence of the pulses on conductor 69 that the service request originated with the ring party.

After the two-party identification test, that is, after the control determines which party is to be billed for the call, the positive and alternating superimposed signals are no longer applied to conductor 82 in the time slot serving the call. Relays 20 and 40 release. As contacts 40–2 and 20–2 are now open relay 30 also releases if it was previously operated. All three relays are thus released, and as contacts 20–1 and 30–1 are now closed the line current flows through the tip and ring conductors from source 25, and the call is supervised for its duration in the normal manner.

Thus a single supervisory magnetic core is utilized for detecting both a service request and an answer by either party on a two-party line and for determining the identification of the originating party as well. The complexity of the supervisory equipment is reduced by providing common equipment, e.g., pulser 84 and transistor 80, to operate with a plurality of line circuits. Supervision of each call is achieved with a minimum number of circuit elements, and the provision of PNPN triode 50, transistor 70, and associated elements insures that the control unit will not detect a change in supervisory condition during the dialing interval.

A similar line circuit may be provided with any multi-party line in the system. For example, full selective ringing may be provided for a four-party line by transmitting four different ringing control signals to the line circuit and in response thereto by applying the conventional positive or negative ringing current to either the tip or ring conductor. When the call is answered the ringing current may be extended to the other conductor to bias the core. Thus, although the invention has been described with reference to a specific embodiment, it is to be understood that this embodiment is only illustrative of the application of the principles of the invention, and that various modifications may be made therein without departing from the spirit and scope of the invention.

What is claimed is:

1. Supervisory equipment for a telephone system comprising a plurality of multi-party line circuits each respectively connected to one of a plurality of telephone lines, a respective supervisory magnetic core coupled to the tip and ring line conductors in each of said line circuits, means coupled to all of said cores for maintaining the magnetization of said cores in a first state, control means for selectively transmitting control signals to said line circuits, means in each of said line circuits responsive to first control signals for applying ringing current to one of the respective tip and ring conductors, means for extending said ringing current to the other of said conductors responsive to an answer by the called party to switch the magnetization of the respective core to a second state, means in each of said line circuits coupled to the respective core for detecting the switching of the core magnetization to determine that the called party has answered, and means in said control means for selectively interrogating said detecting means.

2. Supervisory equipment for a telephone system in accordance with claim 1 further including direct current means in each of said line circuits for switching the magnetization of the respective core to said second state responsive to the origination of a service request, and means included in said interrogating means for interpreting the switching of said magnetization to said second state as representing a service request in the absence of the application of ringing current to either of the respective tip and ring conductors.

3. Supervisory equipment for a telephone system in accordance with claim 2 further including means in each of said line circuits for identifying an originating party comprising means responsive to second control signals received from said control means for inhibiting current flow from said direct current means and for connecting switching means to the respective line, said switching means being operative only responsive to a call origination by a preselected one of the parties served by the respective line, means responsive to said switching means for switching the respective core magnetization to said second state, and means included in said interrogating means for interpreting the switching of said core magnetization to said second state as identifying said preselected party only in the absence of the application of ringing current to said tip and ring conductors and only after said core magnetization was first switched to said second state responsive to a service request and subsequently switched back to said first state by said maintaining means.

4. A two-party telephone line circuit comprising tip and ring conductors, a magnetic core threaded by each of said conductors, means for continuously pulsing said core to normally maintain the core magnetization in a first state, direct current means connected to said conductors for switching the magnetization of said core to a second state responsive to a service request by either party served by said tip and ring conductors, means for applying ringing current to either said tip or ring conductor to ring either of said parties, means for extending said ringing current to the other of said conductors responsive to an answer by the called party to switch the magnetization of said core to said second state, and means connected to said tip conductor for switching the magnetization of said core to said second state a second time responsive and subsequent to the origination of a service request by a preselected one of said two parties.

5. A two-party telephone line circuit in accordance with claim 4 wherein said pulsing means and said direct current means continuously switch the magnetization of said core back and forth between said first and second states, further including switching means coupled to said core and operative in response to the switching of said core magnetization from said second state to said first state, and means for maintaining said switching means operated for a predetermined time interval after the switching of said core from said second to said first magnetization state.

6. A telephone line circuit for a time division switching system comprising a magnetic core, tip and ring conductors coupled to said core, means responsive to control signals transmitted to said line circuit for applying ringing current to either said tip or ring conductor, means responsive to an answer by the called party for extending said ringing current to the other of said conductors to switch the magnetization of said core, source means connected to said tip and ring conductors for switching the magnetization of said core responsive to a service request, and means coupled to said core for detecting the switching of said core magnetization, said switching representing an answer by a called party if said ringing current is present on said tip or ring conductor and representing a service request if said ringing current is not present on either of said tip and ring conductors.

7. A telephone line circuit in accordance with claim 6 further including pulsing means coupled to said core for switching back the core magnetization after it is first switched by said ringing current or said source means, said source means and said pulsing means thereafter alternately switching the magnetization of said core for the duration of the call, and means included in said detecting means for determining the cessation of the switching of the magnetization of said core to verify the termination of said call.

8. A telephone line circuit in accordance with claim 7 further including means for preventing said determining means from verifying a call termination during the dialing period of an originating call.

9. A telephone line circuit comprising tip and ring line conductors having a first telephone subset ringer connected to said tip conductor and a second telephone subset ringer connected to said ring conductor, a supervisory magnetic core, direct current supplying means inductively coupled to said core for switching the magnetization state of said core responsive to a service request of either of the two parties on said line, means for applying ringing current to either said tip or ring conductor, and means including said tip and ring conductors inductively coupled to said core for enabling said ringing current to switch the magnetization state of said core when either of said parties goes off-hook responsive to ringing current being applied to the respective tip or ring conductor.

10. In a telephone line circuit supervisory equipment for detecting an answer by a called party comprising a magnetic core coupled to the telephone line tip and ring conductors, means coupled to said core for normally continuously maintaining the magnetization of said core in a first state, means for applying ringing current to either said tip or ring conductor, means for extending said ringing current to the other of said conductors responsive to an answer by the called party to switch the magnetization of said core to a second state within the first cycle of the ringing current subsequent to said answer, and means coupled to said core for detecting the switching of the magnetization of said core to determine that the called party has answered.

11. In a telephone line circuit in accordance with claim 10 supervisory equipment for detecting a service request comprising direct current means connected to said tip and ring conductors for switching the magnetization of said core to said second state responsive to the origination of a service request, and means included in said detecting means for interpreting the switching of said magnetization to said second state as representing a service request rather than an answer in the absence of ringing current on either said tip or ring conductor.

12. In a telephone line circuit in accordance with claim 11 supervisory equipment for identifying an originating party comprising means for inhibiting current flow from said direct current means, means connected to said telephone line for operating responsive to the origination of a service request by only a preselected party, means responsive to said line-connected means for switching the core magnetization to said second state, and means included in said detecting means for interpreting the switching of said core magnetization to said second state as identifying said preselected party only in the absence of ringing current on either said tip or ring conductor and only after said core magnetization was first switched to said second state responsive to a service request and subsequently switched back to said first state by said maintaining means.

No references cited.

KATHLEEN H. CLAFFY, *Primary Examiner.*

WILLIAM C. COOPER, *Examiner.*